United States Patent
Arai (10) Patent No.: US 6,400,676 B2
(45) Date of Patent: Jun. 4, 2002

(54) DISC-SHAPED RECORDING MEDIUM

(75) Inventor: Masayuki Arai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/842,105

(22) Filed: Apr. 26, 2001

(30) Foreign Application Priority Data

Apr. 27, 2000 (JP) ...................................... 2000-132924

(51) Int. Cl.[7] ................................................ G11B 7/24
(52) U.S. Cl. .................................................. 369/275.3
(58) Field of Search ........................... 369/275.3, 275.4, 369/275.2, 275.1, 272, 277, 279; 428/64.1, 64.2, 64.3, 64.4, 65.3; 430/320, 321

(56) References Cited

U.S. PATENT DOCUMENTS

| | | | | |
|---|---|---|---|---|
| 5,568,467 A | * | 10/1996 | Inagaki et al. ............ | 369/275.3 |
| 6,064,643 A | * | 5/2000 | Tanoue et al. ............ | 369/275.3 |
| 6,091,688 A | * | 7/2000 | Tanoue et al. ................ | 369/59 |
| 6,151,292 A | * | 11/2000 | Yoshimoto et al. ...... | 369/275.3 |
| 6,229,784 B1 | * | 5/2001 | Yoshimoto et al. ...... | 369/275.3 |
| 6,298,033 B1 | * | 10/2001 | Tanoue et al. ........... | 369/275.3 |
| 6,301,208 B1 | * | 10/2001 | Sugaya et al. ............. | 369/47.1 |

\* cited by examiner

*Primary Examiner*—Tan Dinh
(74) *Attorney, Agent, or Firm*—Oblon, Spivak, McClelland, Maier & Neustadt, P.C.

(57) ABSTRACT

To provide a disc-shaped recording medium whose tracks at borders of zones have header information to enable a pick up to transfer to a target track, and whose data fields are not influenced by crosstalk or double refraction caused by the header fields. Two header fields $3_0$ are formed in the two tracks $9_0$ and two header fields $3_1$ are formed in the two tracks $9_1$ such that header fields 3 in the zone $2_n$, header fields $3_0$, header fields $3_1$ and header fields 3 in the zone $2_{n+1}$ range successively. Thus, each of tracks in the border area 7 has at least one header field $3_0$ or $3_1$, and even though a pick up transfers to one of the tracks in the border area 7, the pick up can find header information written in the header field $3_0$ or $3_1$ within a period required for the optical disc 1 to make one rotation.

6 Claims, 7 Drawing Sheets

DISC-SHAPED RECORDING MEDIUM

BACKGROUND OF THE INVENTION

1. Field of the Invention

The present invention relates to a disc-shaped recording medium which has a plurality of tracks each having header fields at which address information is pre-formatted in the form of embossed pits.

2. Description of Related Art

The CLV (Constant Linear Velocity) system which keeps linear velocity of an optical disc constant and the CAV (Constant Angular Velocity) system which keeps angular velocity of an optical disc constant are employed as recording and/or reproducing systems for optical discs. Both of the systems have defects. That is, the CLV system is inferior in ability for having accesses, while the CAV system has low recording density at outer circumferences. So, in order to compensate for these defects, the ZCAV system and ZCLV system are employed. In both systems, recording/reproducing area of an optical disc having a plurality of tracks is divided into a plurality of groups (zones) along the radial direction, and the CAV system is employed within each of the zones. In the ZCAV system, recording frequency is changed in accordance with linear velocity without changing angular velocity when a pick up transfers from one zone to another. On the other hand, in the ZCLV system, angular velocity is changed without changing recording frequency when a pick up transfers from one zone to another.

In the ZCAV system and ZCLV system, the recording medium itself has the same configuration. As described above, the recording/reproducing area of the optical disc having a plurality of tracks is divided into a plurality of zones from the innermost circumference to the outermost circumference, and the CAV system is employed in recording/reproducing data within each of the zones. Furthermore, each of the tracks within a zone has the same number of pre-formatted header fields in one circumference, and a data recording field of a predetermined length is provided following each of the header fields. From the beginning of a header field to the end of a data recording field or before the next header field is termed a sector. The number of sectors within a track of an outer circumference is larger than that within a track of an inner circumference.

Figure 1:
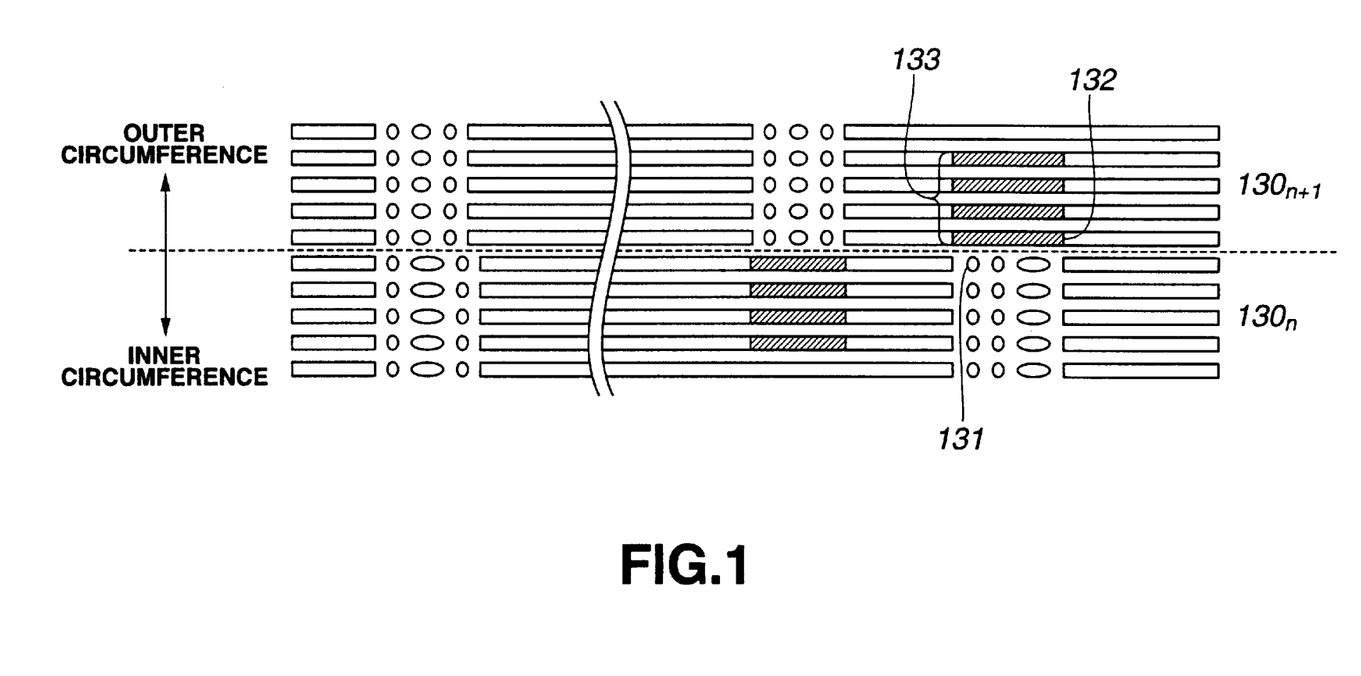
FIG. 1 shows an enlarged view of adjacent zones of a conventional optical disc for explaining the problems.

Since the number of header fields within a track in an outer circumference zone is larger than that within a track in an inner circumference zone, the positions of header fields within a track in a zone do not accord with those of header fields within a track in an adjacent zone along the track direction at borders of zones. That is, there are caused gaps between the positions of header fields within a track in a zone and those of header fields within a track in an adjacent zone at borders of zones. In case the positions of header fields of adjacent tracks do not accord with each other, there arise various problems. As shown in FIG. 1, since a header field 131 of an inner zone $130_n$ adjoins a data field 132 of an outer zone $130_{n+1}$, the influence of signals of the header field 131 appears as crosstalk at the data field 132. Accordingly, data recorded in at least one track cannot be reproduced because of the influence of crosstalk.

Since resin spreads out from the inner side to the outer side when an optical disc is molded, there arises a variation of refractive index or double refraction at the data field 132 which adjoins the header field 131 along the radius direction, which deteriorates signal quality of data fields 133.

Thus, data cannot be correctly reproduced at tracks including the data fields 133 due to the influence of crosstalk or double refraction.

For example, in case the data fields 133 which are subject to crosstalk or double refraction are included in four tracks, four tracks in the zone $130_n$ and four tracks in the zone $130_{n+1}$ cannot be used for recording/reproducing data, as shown in FIG. 1. Thus, the total number of eight tracks cannot be used for recording/reproducing data.

Figure 2:
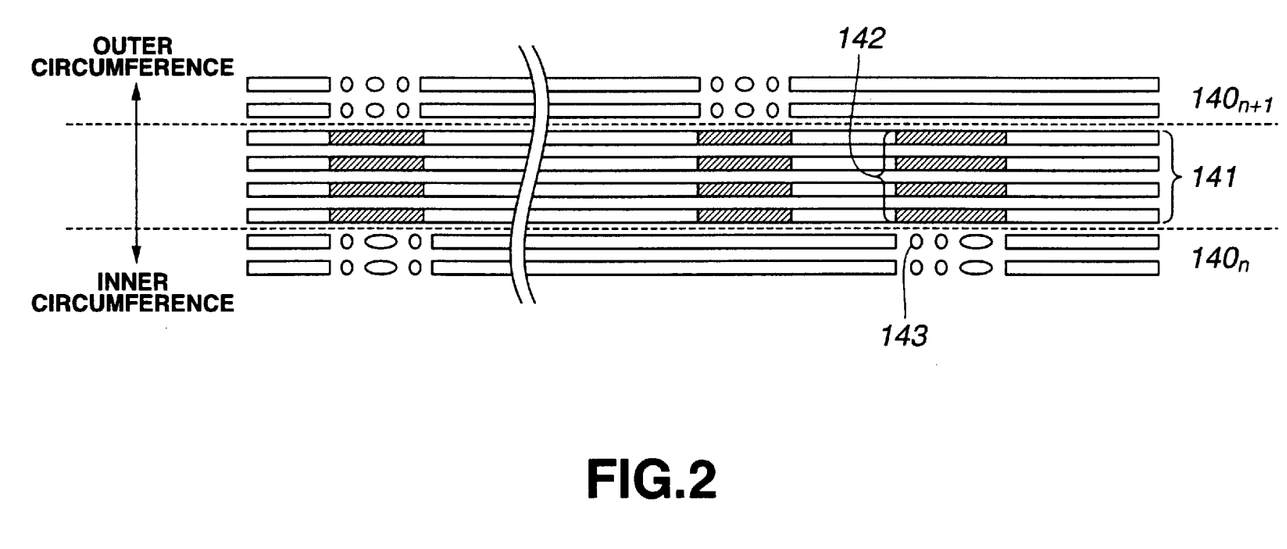
FIG. 2 shows an enlarged view of adjacent zones of an optical disc disclosed in the Japanese Laying-Open Patent H 4-315823.

There is disclosed a technique concerning an optical information recording medium which has tracks consisting of only one or plural guide grooves at the borders of zones in the Japanese Laying-Open Patent H 4-315823. FIG. 2 shows an enlarged view of adjacent zones of an optical disc disclosed in the Japanese Laying-Open Patent. As shown in FIG. 2, the optical information recording medium has border area 141 consisting of, for example, four tracks of guide grooves between usable tracks in a zone $140_n$, and usable tracks in a zone $140_{n+1}$. Thus, data recorded in data recording fields of the usable tracks are not influenced by crosstalk or double refraction, and there exists no data recording fields whose data cannot be correctly reproduced. For this reason, since the optical information recording medium has border area 141 consisting of only four guide grooves at the borders of zones, the total number of unusable tracks at a border between two zones which cannot be used for recording/reproducing data becomes four or half that of the optical disc shown in FIG. 1 which has eight unusable tracks at a border between two zones.

However, in case the optical information recording medium has the border area 141 consisting of only guide grooves at the borders of zones, if a pick up transfers to a track in the border area 141 at the time of having an access to the zone $140_n$ which is adjacent to the border area 141, the pick up cannot find information to transfer to a target track since the tracks in the border area 141 has no header information. Thus, the pick up becomes uncontrollable.

SUMMARY OF THE INVENTION

It is therefore an object of the present invention to overcome the above-mentioned drawbacks by providing a disc-shaped recording medium whose tracks at borders of zones have header information to enable a pick up to transfer to a target track, and whose data fields are not influenced by crosstalk or double refraction caused by the header fields.

According to the present invention, there is provided a disc-shaped recording medium having formed thereon a plurality of tracks each composed of a plurality of sectors, each of the sectors having a header field at which address information is recorded in the form of embossed pits and a data recording field provided following the header field, wherein the tracks are divided into a plurality of groups along the radial direction, and wherein, in two groups adjacent to each other via a border area formed between them, L being the number of the header fields included in a track of the inner group, M being the number of the header fields included in a track of the outer group, and N being the number of the header fields included in a track of the border area satisfy the following equation, $1 \leq N < L$, and $1 \leq N < M$, and wherein the header field included in at least a track of the border area adjoins the header field included in a track of the inner group and the header field included in a track of the outer group along the radial direction with a gap of a predetermined length along the track direction within a range in which data recorded on the data recording field is not influenced by double refraction caused by the header field.

According to the disc-shaped recording medium of the present invention, tracks in border areas of adjacent zones have header fields which adjoin those of the adjacent zones. Thus, each of the tracks in the border areas has at least one header field, and having accesses to the disc around border areas of adjacent zones becomes possible, and data recorded in data recording fields is not influenced by crosstalk or double refraction caused by the header fields.

These objects and other objects, features and advantages of the present intention will become more apparent from the following detailed description of the preferred embodiments of the present invention when taken in conjunction with the accompanying drawings.

DESCRIPTION OF THE PREFERRED EMBODIMENTS

Preferred embodiments according to the present invention will further be described below with reference to the accompanying drawings.

Figure 3:
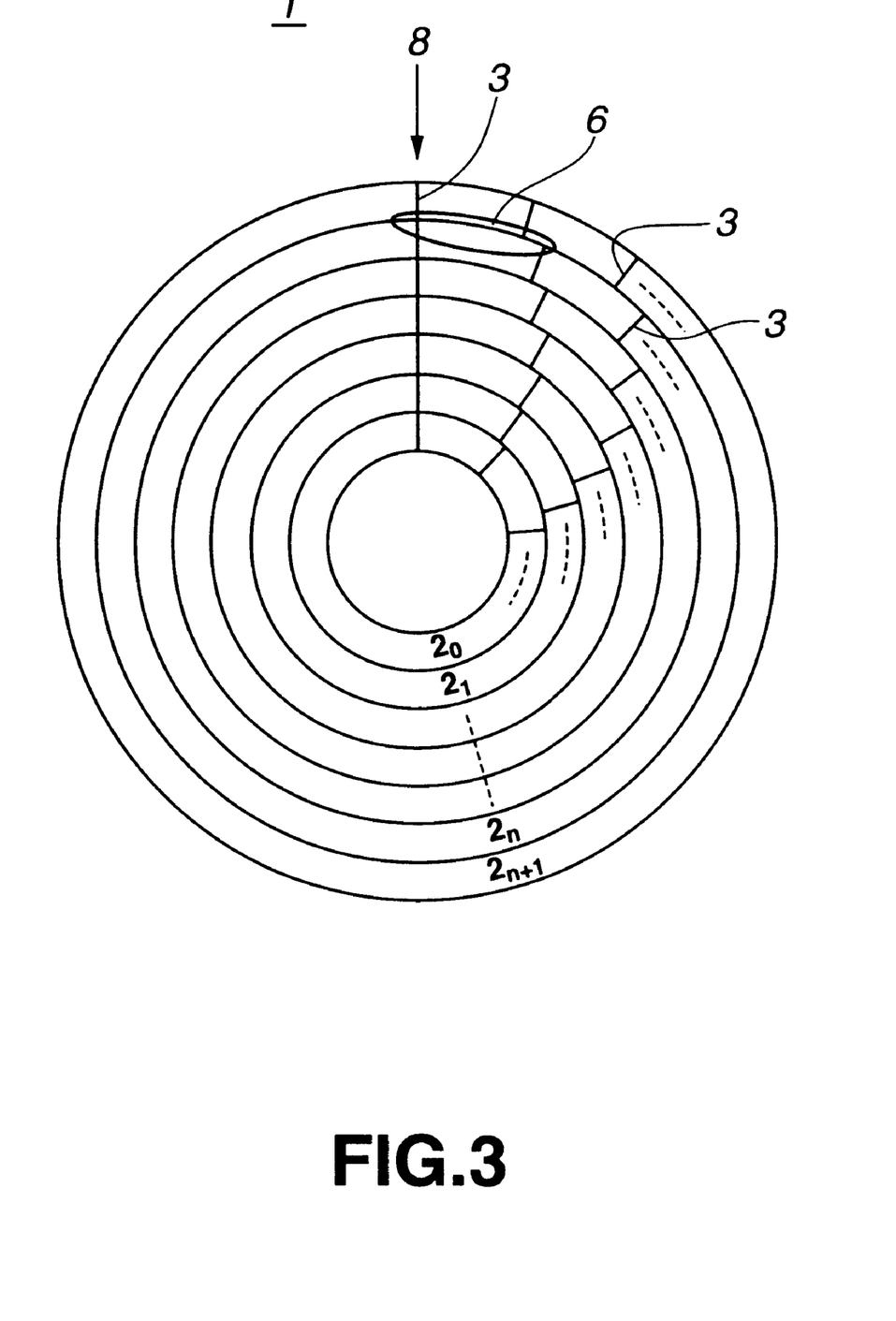
FIG. 3 shows a schematic view of an optical disc according to the present invention.
Figure 4:
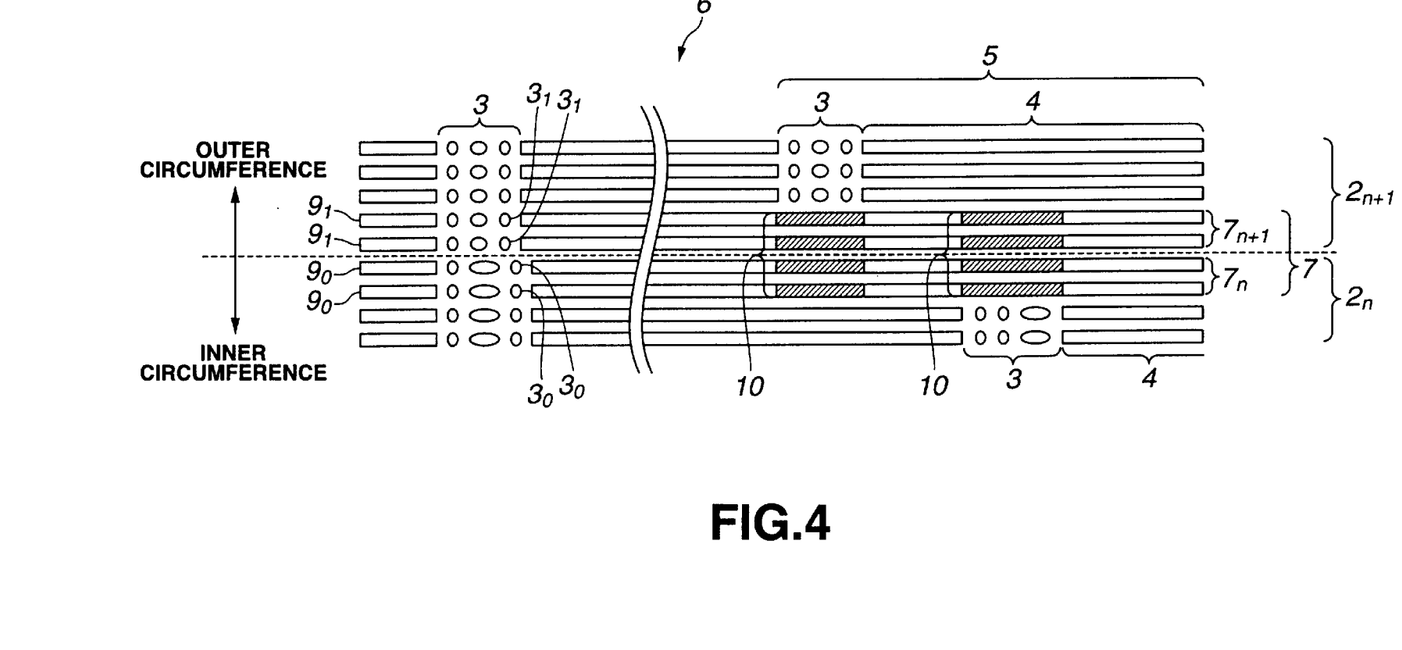
FIG. 4 shows an enlarged view of adjacent zones of the optical disc according to the present invention.

FIG. 3 shows a schematic view of an optical disc 1 according to the present invention. The recording/reproducing area of the optical disc 1 having a plurality of tracks is divided into a plurality of zones $2_0, 2_1, \ldots, 2_n, 2_{n+1}$ from the innermost circumference to the outermost circumference. Data is recorded/reproduced at each zone $2_i$ by the CAV system. Furthermore, each of tracks within the zone $2_i$ has the same number of header fields 3 in one circumference. The header fields 3 have address information recorded thereon which is pre-formatted in the form of embossed pits. FIG. 4 shows an enlarged view of adjoining zones 6 including adjacent zones $2_n$ and $2_{n+1}$ of the optical disc 1. As shown in FIG. 4, a data recording field 4 of a predetermined length is provided following each of the header fields 3. From the beginning of a header field 3 to the end of a data recording field 4 or before the next header field 3 is termed a sector 5. The number of sectors 5 within a track of an outer circumference is larger than that within a track of an inner circumference.

As shown in FIG. 4, in the adjoining zones 6, a border area $7_n$ consisting of two tracks $9_0$ is formed at the zone $2_n$ and a border area $7_{n+1}$ consisting of two tracks $9_1$ is formed at the zone $2_{n+1}$ such that the border area $7_n$ adjoins the border area $7_{n+1}$. Thus, there is formed a border area 7 consisting of the border area $7_n$ and border area $7_{n+1}$, in which four tracks are formed.

It is assumed that a track in the zone $2_n$ has 10 sectors, while the zone $2_{n+1}$ which is located at the outer side of the zone $2_n$ has 11 sectors. Usually, sectors 5 in a track are formed such that each of sectors 5 has the same length. Accordingly, the optical disc 1 can form a line 8 along the radial direction where the header fields 3 range successively, as shown in FIG. 3. Furthermore, two header fields $3_0$ are formed in the two tracks $9_0$ and two header fields $3_1$ are formed in the two tracks $9_1$ such that header fields 3 in the zone $2_n$, header fields $3_0$, header fields $3_1$ and header fields 3 in the zone $2_{n+1}$ range successively. Thus, each of tracks in the border area 7 has at least one header field $3_0$ or $3_1$, and even though a pick up transfers to one of the tracks in the border area 7, the pick up can find header information written in the header field $3_0$ or $3_1$ within a period required for the optical disc 1 to make one rotation.

The tracks $9_0$ and tracks $9_1$ have the header fields $3_0$ and header fields $3_1$ at only above-described one position along the line 8 and do not have any other header fields 3 at other positions so that other data fields in the zone $2_n$ and zone $2_{n+1}$ are not influenced by crosstalk or double refraction caused by the header fields 3. Thus, data fields 10 where data cannot read out due to influence of crosstalk or double refraction by the header fields 3 in the zone $2_n$ does not surpass the border area 7. Similarly, data fields 10 where data cannot read out due to influence of crosstalk or double refraction by the header fields 3 in the zone $2_{n+1}$ does not surpass the border area 7 either.

The data recording field 4 in the border area 7 excluding the header fields 3 are not used for recording ordinary data, and can be used for recording data with low recording density, such as trial writing by a pick up, setting of laser power, or proofreading.

Thus, according to the optical disc 1 shown in FIG. 3 and FIG. 4, since the optical disc 1 has the header fields 3 which range successively along the radial direction, tracks influenced by crosstalk or double refraction caused by the header fields 3 in the adjoining zones 6 can be minimized, and a pick up can have an access over the whole recording/reproducing area of the optical disc 1. Furthermore, since the number of accessible tracks in the border area 7 increases, such tracks can be used for recording data with low recording density, which can be performed even though part of data is broken or lost.

Figure 5:
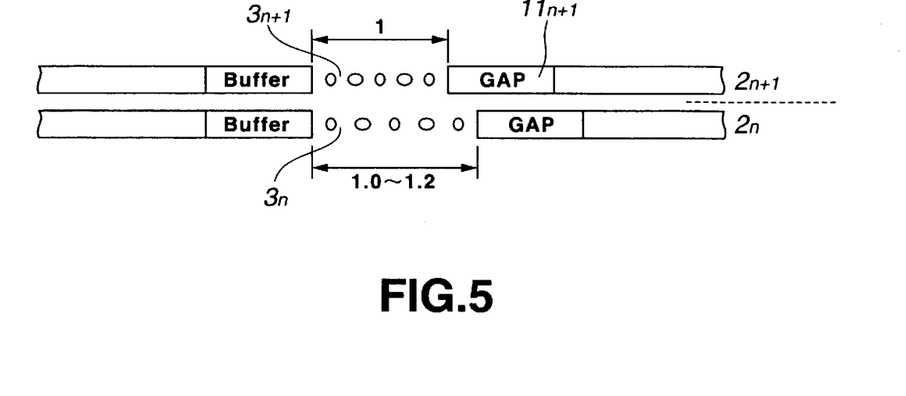
FIG. 5 shows an enlarged view of the adjacent zones for explaining gaps of header fields due to formatting causes.

The length of the header field $3_n$ in the zone $2_n$ is different from that of the header field $3_{n+1}$ in the zone $2_{n+1}$. Usually, the length of the inner header field $3_{n+1}$ is longer than that of the outer header field $3_n$, and the inner header field $3_{n+1}$ and the outer header field $3_n$ is in the ratio of 1.0~1.2 to 1.0, as shown in FIG. 5. At this time, the positions of the header fields $3_n$ in the zone $2_n$ do not accord with those of the header fields $3_{n+1}$ in the zone $2_{n+1}$ along the track direction. In case the header field $3_n$ adjoins the header fields $3_{n+1}$ with a gap, that is the header field $3_n$ adjoins the header fields $3_{n+1}$ and a part of a GAP field $11_{n+1}$ which follows the header field $3_{n+1}$, data recorded in the zone $2_{n+1}$ is not influenced by crosstalk or double refraction caused by the header field $3_n$. This is because the GAP field 11 is for performing APC, and is not usually used for recording data.

Furthermore, at zone borders, positions of the header fields do not accord with each other along the track direction due to manufacturing causes. This discord of positions of the header fields is due to error of rotational servo of a cutting machine which is used for manufacturing a disc master, and is raised when a zone under processing is changed, or due to error of a formatter (a signal generator for recording signals to a disc master). These errors are approximately several channel clocks. For example, when it is prescribed that discord of positions of the header fields or gaps should be ±5 channel clocks along the track direction, the header fields are required to be arranged within an error of ±5 channel clocks along the track direction.

Figure 6:
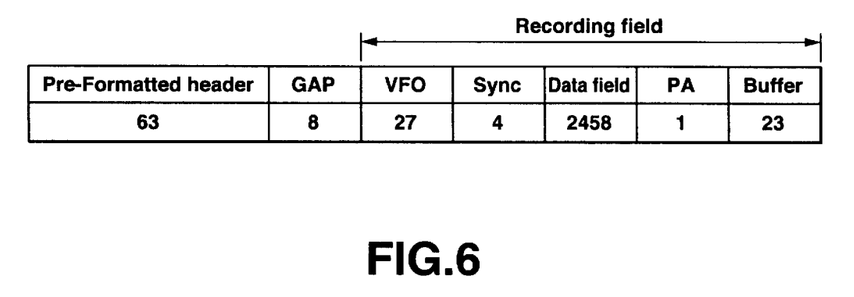
FIG. 6 shows a sector format of a commercialized 3.5-inch MO disc (magneto-optical disc) having a capacity of 640 MB.

FIG. 6 shows an example of a sector format of a commercialized 3.5-inch MO disc (magneto-optical disc) having a capacity of 640 MB. It is noted that one byte corresponds to 12 channel clocks.

As shown in FIG. 6, a GAP field having 8 bytes follows a pre-formatted header field having 63 bytes, and a recording field follows the pre-formatted header field. The recording field consists of a VFO field having 27 bytes, a sync signal field having 4 bytes, a data field having 2458 bytes, a PA field having 1 byte, and a buffer field having 23 bytes.

Figure 7:
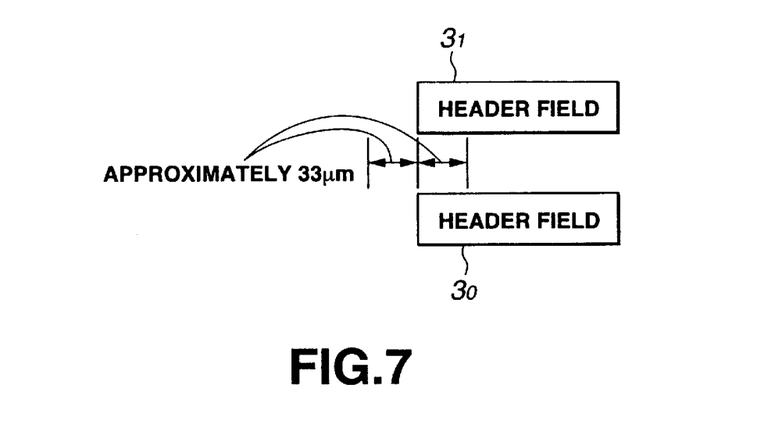
FIG. 7 shows an enlarged view of the adjacent zones for explaining gaps of header fields due to manufacturing causes.

As described above, the GAP field 11 is used for performing APC, and is not usually used for recording data. Thus, even though the positions of adjacent header fields do not accord with each other, recording data is not influenced by crosstalk or double refraction caused by the header field when the header field adjoins the adjacent header field and a part of the GAP field 11. For example, in case above described sector format is employed, 1 channel bit has the length of approximately 0.315~0.34 $\mu$m, and the length of the GPA field becomes approximately 0.34×8×12≈33 $\mu$m. Thus, since the pre-formatted header field can adjoin the GPA field which is not used for user data, the discord of positions or a gap between the header field $3_0$ and header field $3_1$ of approximately ±33 $\mu$m can be allowed at manufacturing process. Accordingly, since the pre-formatted header field adjoins the GAP field which is not used for recording user data, the discord of positions or the gap between the header field $3_0$ and header field $3_1$ can be allowed by ±33 $\mu$m, as shown in FIG. 7. Furthermore, the pre-formatted header field may adjoins the VFO field. In this case, the discord of positions or a gap can be allowed similarly, since the VFO field is not also directly used for recording data.

Figure 8:
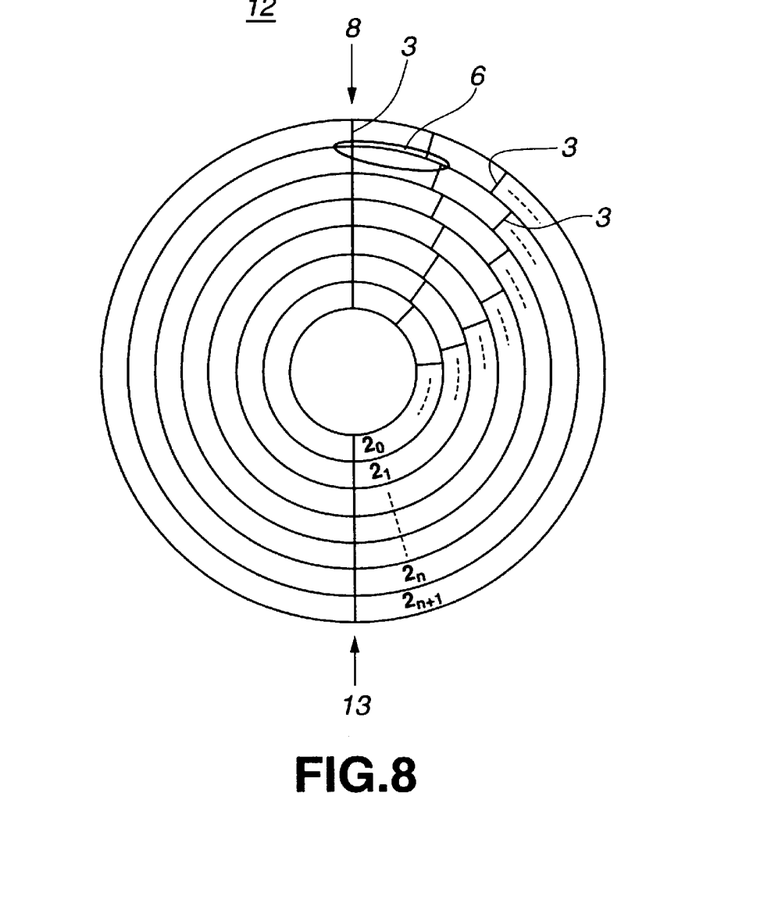
FIG. 8 shows another schematic view of an optical disc according to the present invention.

FIG. 8 shows another schematic view of an optical disc 12 according to the present invention. In the example, it is assumed that a track in the zone $2_n$ has 10 sectors, while the zone $2_{n+1}$ which is located at the outer side of the zone $2_n$ has 12 sectors. In this case, the optical disc 1 can form a line 8 and a line 13 along the radial direction, which are on opposite positions when vied from the center of the disc, where the header fields 3 range successively, as shown in FIG. 8.

With the optical disc 12, discord of positions between the header fields can be allowed similarly as described above using FIG. 5 to FIG. 7. Thus, the total number of unusable tracks at a border between two zones which cannot be used for recording/reproducing data can be minimized, and a pick up can have an access over the whole recording/reproducing area of the optical disc 12. Furthermore, since the number of accessible tracks in the border area increases, such tracks can be used for recording data with low recording density, which can be performed even though part of data is broken or lost. Furthermore, the number of lines formed along the radial direction of the optical disc 12 where the header fields 3 range successively is larger than that of the line formed along the radial direction of the optical disc 1. Thus, a pick up can have an access to the optical disc 12 more rapidly.

Heretofore, the optical disc 1 and optical disc 12 had been described as preferred embodiments according to the present invention. Next, a generalized embodiment of the present invention will be described hereinafter. It is assumed that the numbers of header fields of adjacent tracks which are at the border area of adjacent zones are L and M, and the number of lines where header fields 3 substantially range successively along the radial direction is N. At this time the N equals to 1 or more, and equals to the greatest common divisor GCD [L, M] or less. That is, the number L, M and N satisfy the following equation.

$$1 \leq N \leq GCD [L, M]$$

The difference of the numbers of header fields of adjacent tracks which are at the border area of adjacent zones is 1, the number N is 1.

Figure 9:
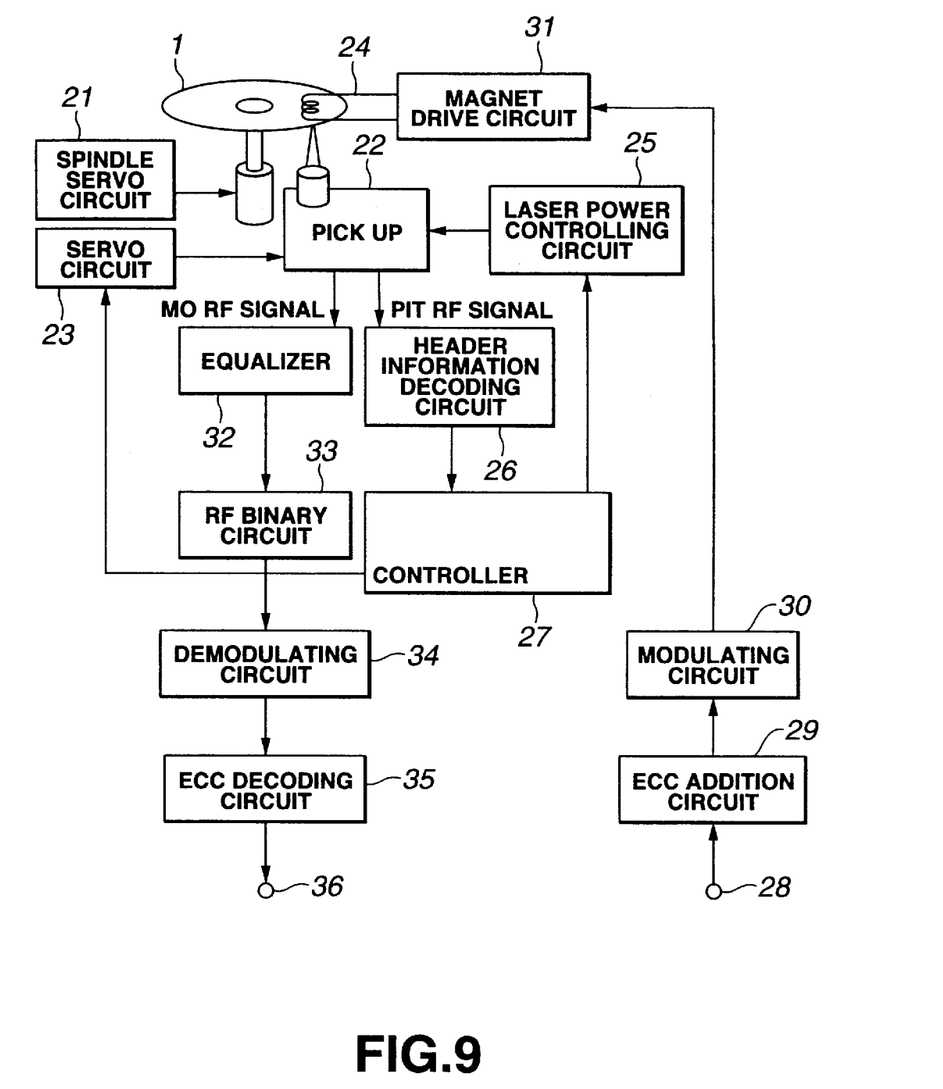
FIG. 9 is a block diagram showing the configuration of a recording and/or reproducing apparatus for recording/reproducing information signals to the optical disc.

FIG. 9 is a block diagram showing the configuration of a recording and/or reproducing apparatus for recording/reproducing information signals to/from the optical disc 1. The recording and/or reproducing apparatus also records/reproduces information signals to/from the optical disc 12.

The recording and/or reproducing apparatus includes a spindle servo circuit 21, a pick up 22, a servo circuit 23, an external magnetic field generating coil 24, and a laser power controlling circuit 25. The optical disc 1 is so controlled as to be rotated with a prescribed constant angular velocity by the spindle servo circuit 21. The pick up 22 is so controlled as to record/reproduce data at a predetermined position to/from the optical disc 1 by the servo circuit 23. The external magnetic field generating coil 24 is located on an extension line of a laser beam radiated from the pick up 22. The laser beam is so controlled as to keep a predetermined power by the laser power controlling circuit 25.

The recording and/or reproducing apparatus further includes a header information decoding circuit 26, and a controller 27. The pick up 22 reads out header information recorded on the header fields of the optical disc 1 as PITRF signals, and sends the signals to the header information decoding circuit 26. The header information decoding circuit 26 decodes track address information and sector information recorded on the optical disc 1, and sends position information to the controller 27. Thus, controller 27 moves the pick up 22 to a predetermined position on the optical disc 1, and records/reproduces data to/from the position.

Next, data flow at the time of recording/reproducing data to/from the optical disc 1 will be explained.

The recording and/or reproducing apparatus further includes an ECC addition circuit 29, a modulating circuit 30, and a magnet drive circuit 31. The ECC addition circuit 29 adds error correction codes to data sent from an input terminal 28, and the modulating circuit 30 performs EFM plus modulation which is used for DVDs etc. for the data when recording the data to the optical disc 1. Thus modulated data is sent to the magnet drive circuit 31 to generate + and − magnetic fields from the external magnetic field generating coil 24 in accordance with the modulated data. When the magnetic fields are generated, the controller 27 controls the laser power controlling circuit 25 so that the laser beam has a recording power. Thus, recording marks corresponding to polarities of the external magnetic fields are formed on the optical disc 1.

The recording and/or reproducing apparatus further includes an equalizer 32, an RF binary circuit 33, demodulating circuit 34, and an ECC decoding circuit 35. When reproducing data from thus formed marks, the MORF signals read out from the pick up 22 are wave-shaped by the equalizer 32, and sent to the RF binary circuit 33. The wave-shaped signals are converted to digital 1 data or digital 0 data by the RF binary circuit 33, and sent to the demodulating circuit 34. The reproduced data is demodulated by the demodulating circuit 34, and corrected by the ECC decoding circuit 35 when error is found in the demodulated data to reproduce original information. Thus, magneto-optical signals are recorded/reproduced.

As described above, pre-formatted header information is very important for the recording and/or reproducing apparatus as position information for writing or reading out data. When moving the pick up 22 to a desired position, the controller 27 calculates the difference between the current position and target position from the read out header information, and judges the number of tracks that the pick up 22 has to jump to inner circumference or outer circumference to transfer to the target position. Then the controller 27 sends an instruction for jumping tracks to the servo circuit 23.

In case the border area has tracks consisting of only guide grooves as described using FIG. 2, when the pick up 22 has an access to the tracks, the pick up 22 cannot find out the current position. So, the pick up 22 has to jump the tracks to inner circumference or outer circumference by several tracks until the pick up 22 finds out the header information, and then jumps to the target position after finding out header information.

In case tracks in the border area have header fields, as described using FIG. 4, even though the pick up 22 has an access to the tracks, the pick up 22 can acquire header information within a period required for the optical disc 1 to make one rotation, and can find out the current position. So, the pick up 22 can calculate the difference between the current position and target position immediately. Thus, the pick up 22 can have an easy access to the target position.

As described above, according to the present invention, each of tracks in the border area of adjacent zones has at least one pre-formatted header field. Thus, the pick up can have an access to the optical disc around the border area. Furthermore, when the optical disc has an access to a track around the border area, there is no possibility that the pick up cannot read out a track address. Thus, the pick up can have a correct and immediate access to the target track. Furthermore, since the pick up can have an access to tracks in the border area, these tracks can effectively be used for recording data with low recording density etc. Furthermore, since each of tracks in the border area has pre-formatted header information, and header numbers are successively attached to each of the tracks, radius information of the disc can easily be calculated.

What is claimed is:

1. A disc-shaped recording medium having formed thereon a plurality of tracks each composed of a plurality of sectors, each of the sectors having a header field at which address information is recorded in the form of embossed pits and a data recording field provided following the header field, wherein the tracks are divided into a plurality of groups along the radial direction, and wherein, in two groups adjacent to each other via a border area formed between them, L being the number of the header fields included in a track of the inner group, M being the number of the header fields included in a track of the outer group, and N being the number of the header fields included in a track of the border area satisfy the following equation, $1 \leq N < L$, and $1 \leq N < M$, and wherein the header field included in at least a track of the border area adjoins the header field included in a track of the inner group and the header field included in a track of the outer group along the radial direction with a gap of a predetermined length along the track direction within a range in which data recorded on the data recording field is not influenced by double refraction caused by the header field.

2. The disc-shaped recording medium as set forth in claim 1, wherein all the header fields included in tracks of the border area adjoins the header field included in a track of the inner group and the header field included in a track of the outer group along the radial direction with a gap of a predetermined length along the track direction within a range in which data recorded on the data recording field is not influenced by double refraction caused by the header field.

3. The disc-shaped recording medium as set forth in claim 1, wherein the length of the header field included in at least a track of the border area is longer than that of the header field included in a track of the outer group by 0~20%.

4. The disc-shaped recording medium as set forth in claim 1, wherein the sector has a gap field of a predetermined length between the header field and the data recording field, and the header field included in a track of the inner group adjoins the header field included in at least a track of the border area with a gap within the gap field.

5. The disc-shaped recording medium as set forth in claim 1, wherein the N being the number of the header fields included in a track of the border area, and GCD [L, M] being the greatest common divisor of the L being the number of the header fields included in a track of the inner group and the M being the number of the header fields included in a track of the outer group satisfy the following equation, $1 \leq N \leq GCD[L, M]$.

6. The disc-shaped recording medium as set forth in claim 1, wherein the N being the number of the header fields included in a track of the border area is 1.

* * * * *